United States Patent Office 3,767,685
Patented Oct. 23, 1973

3,767,685
NOVEL 11β-HALO-STEROIDS OF THE
OESTRANE SERIES
Nicolaas Pieter van Vliet, Rhenen, Netherlands, assignor
to Akzona Incorporated, Asheville, N.C.
No Drawing. Filed Feb. 2, 1972, Ser. No. 223,016
Int. Cl. C07c *169/08*
U.S. Cl. 260—397.5    6 Claims

ABSTRACT OF THE DISCLOSURE

The present invention relates to novel $\Delta^4$-3-desoxo-11β-halo-steroids of the oestrene series and to a process for the preparation thereof, which compounds have very strong progestational, ovulation-inhibiting, anabolic, androgenic and gonad-inhibiting properties.

---

The invention relates to novel 11β-halo-steroids of the oestrane series, and to a process for the preparation thereof.

More particularly, the invention relates to the novel $\Delta^4$-3-desoxo-11β-halo-19-nor-steroids compounds of the formula:

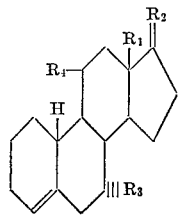

in which $R_1$ = an alkyl group with 1–4 C-atoms,
$R_2$ = a keto group or ($\alpha$P) ($\beta$Q), in which
  P = hydrogen, or an alkyl, alkenyl or alkynyl group with 1–4 C-atoms, and
  Q = a free, esterified or etherified hydroxyl group,
$R_3$ = hydrogen, or a methyl group, and
$R_4$ = fluorine, chlorine or bromine.

The new compounds according to the invention are very valuable on account of their very strong anabolic, androgenic, progestative, ovulation-inhibiting and gonad-inhibiting activities.

Of particular importance is the group of compounds of the general formula:

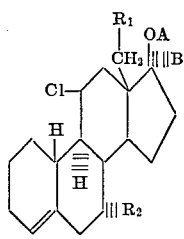

in which

A = hydrogen, or an acyl group with 1–18 C-atoms,
B = an alkyl, alkenyl or alkynyl group with 1–4 C-atoms, and
$R_1$ and $R_2$ = H or a methyl group.

The compounds according to the invention can be prepared by converting the corresponding 11α-hydroxy compound into the 11β-halo-steroid by a method known per se, after which the desired substituents, if lacking, can be introduced by any method known per se.

The halogenation of the 11α-hydroxy compound to an 11β-halo compound can be effected by using a halogenating agent of the general formula:

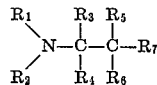

in which $R_1$ and $R_2$ are identical or different alkyl, aryl or aralkyl groups, or form together with the nitrogen a heterocyclic ring,
$R_3$ = fluorine, chlorine, or bromine,
$R_4$ and $R_5$ form together a carbon-carbon bond, or
$R_4$ = fluorine, chlorine or bromine, and
$R_5$ = hydrogen,
$R_6$ = fluorine, chlorine or bromine, and
$R_7$ = fluorine, chlorine, bromine or trifluoromethyl.

For the fluorination a halogenating agent of the general formula:

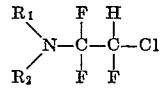

in which $R_1$ and $R_2$ represent identical or different alkyl, aryl or aralkyl groups, possibly in combination with a dissociable fluoride such as the lithium fluoride, is preferably employed.

For the chlorination and bromination it has proved to be advantageous to perform the reaction with a halogenating agent, the general formula of which has been given before, in which $R_3$, $R_4$ and $R_6$ represent fluorine, $R_5$ hydrogen, and $R_7$ chlorine or bromine, in the presence of a dissociable chloride or bromide such as the lithium-chloride or -bromide, the hydrochloride or hydrobromide of a tertiary amine including the triethyl amine, and the chloride or bromide of a quaternary ammonium compound such as the tetrabutyl ammonium.

For the chlorination a chlorinating agent of the general formula:

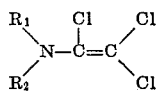

in which $R_1$ and $R_2$ represent identical or different alkyl groups, can also be used advantageously.

The relative halogenation reaction is performed in an inert solvent. As examples thereof are mentioned: aliphatic, cycloaliphatic and aromatic hydrocarbons such as pentane, hexane, cyclohexane, benzene and toluene, halogenated (cyclo)aliphatic and aromatic hydrocarbons such as methylene chloride chloroform and chlorobenzene, carboxylic acid esters such as ethyl acetate, ethyl propionate and butyl acetate, ethers such an dimethyl ether, diethyl ether, dioxane and tetrahydrofuran, alcohols such as t-butyl alcohol and t-amyl alcohol, nitrils such as acetonitrile, or ketones such as methylethyl ketone and acetone.

The reaction temperature is not tied to strict limits, but it is mostly between —40° C. and +80° C. For preference the halogenation is performed at a temperature ranging between —20° C. and +20° C.

On application of the halogenation method described before and the variants on it, the 17-keto-steroid is preferably employed, which, after halogenation, is converted into a compound with the substituents desired in the 17-position.

Another halogenation method also starts from an 11α-hydroxy-steroid, which is reacted in an inert solvent with an agent yielding positive chlorine or bromine in the presence of anhydrous sulphur dioxide.

Preferential agents yielding positive chlorine or bromine are N-chloro(bromo)-imide, -amide, or -hydantoine, such as N-chloro(bromo)-succinimide, -phthalimide, or -acetamide.

This reaction is preferably performed in anhydrous conditions and in the absence of light.

Suitable solvents for the reaction just mentioned are the solvents employed in the first halogenation method, and further dialkyl acylamides, including dimethylformamide and diethylacetamide, or tertiary amines, including pyridine, collidine and quinoline.

The sulphur dioxide to be employed can be bubbled through as a gas, added as a liquid, or be formed in the reaction mixture from a compound which in situ yields sulphur dioxide, such as an alkali metal hyposulphite.

The starting product in this reaction is preferably the $\Delta^4$-11$\alpha$-hydroxy-17-keto-oestrene. Where an 11$\alpha$-hydroxy-steroid is employed as the starting material, which has a secondary hydroxyl group in the 17-position, this hydroxyl group must be protected, for example by esterification or etherification.

The temperatures at which the reaction can advantageously take place are similar to those mentioned before.

There is mostly an excess of positive chlorine or bromine.

An 11$\alpha$-hydroxy-steroid can also be reacted with a substituted sulphonyl halide such as the toluene sulphonyl halide, and the resulting compound converted into the 11$\beta$-chloro-steroid in an inert solvent such as for example tetrahydrofuran, by means of a chloride salt such as lithium chloride, triethyl ammonium hydrochloride and tetrabutyl ammonium chloride.

Chlorination or bromination is further possible by either dissolving the 11$\alpha$-hydroxy-steroid in an inert solvent containing chlorine or bromine, or dissolving in a possibly substituted alkyl-chloride or -bromide, such as carbontetrachloride or carbontetrabromide, and carbonmonobromotrichloride, together with a triaryl phosphine such as the triphenyl phosphine or triaryl phosphite.

The starting products for said halogenation methods are usually prepared from a $\Delta^4$-3-keto-17$\beta$-hydroxy-oestrene, or a $\Delta^4$-3-keto-17-oestrene, with possibly the desired substituents in the 7- and 13-positions already present, by introducing an 11$\alpha$-hydroxyl group and desoxygenating the 3-oxygen substituent.

The 11$\alpha$-hydroxyl group can be introduced by a microbiological method, for example by application of a microorganism such as *Aspergillus ochraceus* and *Rhizopus nigricans*.

A chemical method to introduce the 11$\alpha$-hydroxyl group consists in that a suitable $\Delta^{9(11)}$-steroid is treated with diboran, followed by a treatment of the boron complex formed with alkaline hydrogen peroxide. By a suitable $\Delta^{9(11)}$-steroid is meant a steroid the keto groups of which are protected against the action of diboran by for example ketalisation.

The desoxygenation of the $\Delta^4$-3,17-diketo-11$\alpha$-hydroxy-oestrene or the $\Delta^4$-3,11,17-triketo - oestrene, which is formed after oxidation of the relative 11-hydroxy compound with for example chromium-trioxide, is preferably performed via a thioketalisation in the 3-position, followed by a ketalisation in the 17-position, after which a treatment with an alkali metal in liquid ammonia gives the relative $\Delta^4$-3-desoxy compound. The resulting $\Delta^4$-11$\alpha$-hydroxy-17-keto-oestrene-17-ketal is hydrolysed in one of the conventional manners to the $\Delta^4$-11$\alpha$-hydroxy-17-keto-oestrene.

The susbtituents desired in the 17-position can already be introduced in the thioketal stage, but it is to be preferred to introduce the substituents only into the 3-desoxy compound, either before or after halogenation, dependent upon the method adopted. The introduction of a saturated or unsaturated alkyl group in the 17-position is realised by condensing a metal derivative of the saturated or unsaturated aliphatic hydrocarbon with the relative 17-ketosteroid.

The metal derivative may be a Grignard compound, for example the magnesium bromide of the relative hydrocarbon, or an alkali metal compound. A special performance of this for the preparation of the 17$\beta$-hydroxy-17$\alpha$-alkynyl compound consists in reacting the 17-keto-steroid with a triple unsaturated hydrocarbon in the presence of an alkali metal compound such as an alkali metal-amide or -alcoholate, or by adding a metal compound of a triple unsaturated hydrocarbon, including the alkali and alkaline earth metal compounds, to the 17-keto group of the starting product.

After halogenation the 17$\alpha$-alkylation can also be performed in two steps, which depends upon the 11$\beta$-halo-substituent. First the 17$\beta$-hydroxy-17$\alpha$-alkynyl compound is prepared via a condensation, after which this compound is converted into the corresponding 17$\alpha$-alkenyl or 17$\alpha$-alkyl compound by reduction.

The hydrocarbon radical possibly present in the 17-position in the final products may be a methyl, ethyl, propyl, butyl, vinyl, propenyl, allyl, methallyl, butadienyl, ethynyl, propynyl, propargyl, butynyl or butadiynyl radical.

The secondary of tertiary 17-hydroxy-steroids prepared by the above process can be esterified or etherified, if desired. In the esterification inorganic acids such as phosphoric acids, or saturated or unsaturated organic carboxylic acids with 1–18 C-atoms can be employed.

The preparation of these esters can take place by a method known per se by reacting the 17-hydroxy-steroid with the relative acid, or an active form of it such as the anhydride or halide, or by reacting the reaction product formed during the condensation of a 17-keto-steroid with a metal derivative of an unsaturated hydrocarbon radical, with the relative acid or a derivative of it, without previous hydrolysis. In the choice of the esterification method the stability of the 11$\beta$-halo group should naturally be taken into account.

As examples of organic carboxylic acids, preferably with 1–18 C-atoms, to be employed in the esterification are mentioned: formic acid, acetic acid, propionic acid, butyric acid, valeric acid, capric acid, undecylic acid, lauric acid, tridecylic acid, myristic acid, pentadecylic acid, oleic acid, palmitic acid, stearic acid, trimethyl acetic acid, diethyl acetic acid, cyclohexane carboxylic acid, cyclopentyl propionic acid, cyclohexyl butyric acid, cyclohexyl propionic acid, undecylenic acid, benzoic acid, phenyl acetic acid, phenyl propionic acid, phenyl butyric acid, malonic acid, succinic acid, glutaric acid, pimelic acid, and tartaric acid.

The 17-ether group can be derived from an aliphatic, aromatic, araliphatic or heterocyclic hydrocarbon.

The methyl group possibly present in the 7$\alpha$-position is preferably already present in the starting product, such as for example in the $\Delta^4$-3,17-diketo-7$\alpha$-methyl-oestrene.

The substituents in the 13-position, viz a methyl, ethyl, propyl or isopropyl group, are also already present in the starting product for the halogenation.

The compounds obtained by the process of the invention can be administered parenterally or orally in the form of suspensions, emulsions, or solid pharmaceutical dosage units such as tablets, pills and coated tablets, usually after being mixed with auxiliaries, and, if desired, other active components.

The invention is illustrated by the following examples:

PREPARATION STARTING PRODUCTS

To a solution of 25.0 gm. of $\Delta^4$-3,17-diketo-11$\alpha$-hydroxy-oestrene in 300 ml. of methanol, containing 3.7 ml. of borium-trifluoride etherate were added 10.0 ml. of ethanedithiol, while the solution was boiling. The mixture was refluxed for 30 minutes, after which it was cooled down to 30° C. and the crystalline precipitate filtered off to obtain 29.0 gm. of $\Delta^4$-3,17-diketo-11$\alpha$-hydroxy-oestrene-3,3-ethylene thioketal; M.P. 255–258° C.; $[\alpha]_D$ =+110° (CHCl$_3$).

To a suspension of 25.0 gm. of $\Delta^4$-3,17-diketo-11$\alpha$-hydroxy-oestrene-3,3-ethylene thioketal in 250 ml. of toluene were added, in nitrogen atmosphere, 12.5 ml. of ethylene glycol, 0.50 gm. of p-toluene sulphonic acid and 15 ml. of ethylorthoformiate. The mixture was refluxed for 2 hours, after which a 10% sodium hydroxide solution was added at 20° C. until pH 9. The toluene layer was separated, washed with water and evaporated to an oil. This oil was dissolved in 100 ml. of tetrahydrofuran. The solution obtained was added slowly, dropwise, in 45 minutes, while stirring vigorously to a solution of 3.5 gm. of lithium in 950 ml. of liquid ammonia. The mixture was stirred for 1 hour, after which a mixture of 25 ml. of ethanol and 50 ml. of hexane was added. The ammonia was evaporated off, whereupon 125 ml. of water and 100 ml. of hexane were added dropwise. The organic layer was separated and washed with 75 ml. of 70% methanol-water and water. The solution was evaporated to an oil, which was dissolved in acetone. Sixty ml. of 2 N hydrochloric acid were added to the solution, and the mixture was stirred for 2.5 hours at 20° C. The reaction was decomposed with a 10% sodium hydroxide solution to obtain a neutral mixture. The acetone was evaporated off, after which 200 ml. of water were added. While stirring for one hour a crystalline precipitate formed, yielding 13.8 gm. of $\Delta^4$-11$\alpha$-hydroxy-17-keto-oestrene.

M.P.: 126–128° C.; $[\alpha]_D$=+88° (CHCl$_3$).

In the same manner were obtained from the corresponding 3-keto compounds:

$\Delta^4$-7$\alpha$-methyl-11$\alpha$-hydroxy-17-keto-oestrene and
$\Delta^4$-11$\alpha$-hydroxy-17-keto-18-methyl-oestrene.

EXAMPLE I

Five gm. of $\Delta^4$-11$\alpha$-hydroxy-17-keto-oestrene were dissolved in 100 ml. of methylene chloride. At $-15°$ C., and in nitrogen atmosphere, 4.2 ml. of N(2-chloro-1,1,2-trifluoroethyl)-diethyl-amine were added. The mixture was stirred at $-15°$ C., for 65 hours, after which it was poured into 200 ml. of a 10% sodium bicarbonate solution. The methylene chloride layer was washed with water and evaporated. Chromatography over silicagel with hexane/acetone, 95:5, and crystallisation from ether gave 2.0 gm. of $\Delta^4$-11$\beta$-fluoro-17-keto-oestrene; M.P.: 150–152° C.; $[\alpha]_D$=+142° (CHCl$_3$).

EXAMPLE II

To a solution of 6.0 gm. of $\Delta^4$-11$\alpha$-hydroxy-17-keto-oestrene in 50 ml. of tetrahydrofuran were added at 0° C., in nitrogen atmosphere, 4.0 gm of lithium chloride and 6.0 ml. of N(2-chloro-1,1,2-trifluoroethyl)-diethylamine. The mixture was stirred for 1 hour at 0° C., after which it was poured into 1000 ml. of ice water. The resulting precipitate was collected and recrystallised from ether to obtain 4.5 gm. of $\Delta^4$-11$\beta$-chloro-17-keto-oestrene; M.P.: 159–161° C.; $[\alpha]_D$=174° (CHCl$_3$).

The reaction was also performed with tetrabutyl ammonia chloride in place of lithium chloride with the same result.

EXAMPLE III

To a solution of 6.0 gm. of $\Delta^4$-11$\alpha$-hydroxy-17-keto-oestrene in 100 ml. of tetrahydrofuran were added 35 ml. of N,N-diethyl-trichlorovinylamine. The mixture was refluxed for 24 hours in nitrogen atmosphere and processed to obtain $\Delta^4$-11$\beta$-chloro-17-keto-oestrene; M.P.: 159–161° C.; $[\alpha]_D$=+174° (CHCl$_3$).

EXAMPLE IV

At 0° C. acetylene was bubbled through a suspension of 3.0 gm. of potassium-t-butoxide in 30 ml. of tetrahydrofuran for 2 hours. The suspension was cooled down to $-10°$ C., after which a solution of 1.6 gm. of $\Delta^4$-11$\beta$-fluoro-17-keto-oestrene in 30 ml. of tetrahydrofuran were slowly added dropwise. For 2 hours acetylene was bubbled through the mixture at $-10°$ C., while stirring, after which 2 N sulphuric acid was added dropwise to adjust the pH to 3, and the organic layer was separated and washed with water. After evaporation and crystallisation from ether/hexane 1.56 gm. of $\Delta^4$-11$\beta$-fluoro-17$\alpha$-ethynyl-17$\beta$-hydroxy-oestrene were obtained; M.P.: 143–145° C.; $[\alpha]_D$=+16° C. (CHCl$_3$).

In the same manner were prepared from the corresponding 17-keto compounds:

$\Delta^4$-11$\beta$-chloro-17$\alpha$-ethynyl-17$\beta$-hydroxy-oestrene,
$\Delta^4$-7$\alpha$-methyl-11$\beta$-chloro-17$\alpha$-ethynyl-17$\beta$-hydroxy-oestrene,
$\Delta^4$-7$\alpha$-methyl-11$\beta$-fluoro-17$\alpha$-ethynyl-17$\beta$-hydroxy-oestrene, and
$\Delta^4$-11$\beta$-chloro-17$\alpha$-ethynyl-17$\beta$-hydroxy-18-methyl-oestrene.

EXAMPLE V

To a solution of 2.36 gm. of $\Delta^4$-11$\beta$-fluoro-17-keto-oestrene in 40 ml. of ether and 40 ml. of benzene were added at 0° C., in nitrogen atmosphere, 50 ml. of a 1.3 N solution of ethyllithium in ether. The mixture was stirred for 24 hours at 15° C., after which it was poured out into 300 ml. of water. The mixture was acidified with 2 N hydrochloric acid, whereupon the water layer was extracted with ether. The organic layers were washed with water and evaporated.

Chromatography over silicagel with hexane/acetone, 95:5, and crystallisation from methanol yielded 2.07 gm. of $\Delta^4$-11$\beta$-fluoro-17$\alpha$-ethyl-17$\beta$-hydroxy-oestrene; M.P.: 75–78° C.; $[\alpha]_D$=+42° (CHCl$_3$).

In the same manner were prepared from the corresponding 17-keto compounds:

$\Delta^4$-11$\beta$-chloro-17$\alpha$-ethyl-17$\beta$-hydroxy-oestrene,
$\Delta^4$-7$\alpha$-methyl-11$\beta$-fluoro-17$\alpha$-ethyl-17$\beta$-hydroxy-oestrene,
$\Delta^4$-11$\beta$-chloro-17$\alpha$-ethyl-17$\beta$-hydroxy-18-methyl-oestrene.

EXAMPLE VI

To a solution of 0.55 gm. of $\Delta^4$-11$\alpha$-hydroxy-17-keto-oestrene in 15 ml. of dry pyridine were added at 15° C. 0.35 gm. of N-chloro succinimide. After 40 minutes the reaction mixture was cooled down to 10° C. in the dark, in nitrogen atmosphere, and treated with sulphur dioxide till a negative test result was obtained with an acidified potassium iodide starch paper. Then water was slowly added, the temperature being kept below 30° C. The resulting precipitate was filtered off, washed and dried. Recrystallisation from ether yielded the $\Delta^4$-11$\beta$-chloro-17-keto-oestrene; M.P.: 159–161° C.; $[\alpha]_D$=+174° (CHCl$_3$).

EXAMPLE VII

To a solution of 2.4 gm. of $\Delta^4$-11$\alpha$-hydroxy-17-keto-oestrene in 70 ml. of ether and 50 ml. of benzene were added dropwise at 0° C., in nitrogen atmosphere, 90 ml. of a 1.3 N solution of ethyllithium in ether. The mixture was stirred for 2 hours at room temperature and then poured out into 300 ml. of water. The mixture was acidified with 2 N hydrochloric acid and extracted with ether. The solvent was washed and evaporated off. Chromatography over silicagel with hexane/acetone, 95:5, gave the $\Delta^4$-11$\alpha$,17$\beta$-dihydroxy-17$\alpha$-ethyl-oestrene.

Of the compound obtained 1.0 gm. was dissolved in 30 ml. of dry pyridine at 15° C., after which 0.65 gm. of N-chlorosuccinimide was added. After 15 minutes the reaction mixture was cooled down in the dark to 10° C., in nitrogen atmosphere, and treated with sulphur dioxide until a negative test result was obtained with an acidified potassium iodide paper.

Then water was slowly added, the temperature being kept below 30° C. The precipitate was filtered off, washed and dried. Chromatography over silicagel gave the Δ⁴-11β - chloro - 17α - ethyl - 17β - hydroxy-oestrene; M.P.: 115–117° C.; [α]_D=+99° (CHCl₃).

I claim:
1. An 11β-halo-steroid of the formula:

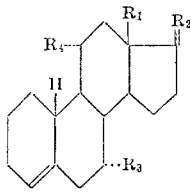

wherein $R_1$ is an alkyl group with 1–4 carbon atoms,
$R_2$ is selected from the group consisting of a keto group and the group αP(βQ), wherein
   P is selected from the group consisting of hydrogen and an alkyl, alkenyl and alkynyl group with 1–4 carbon atoms, and
   Q is selected from the group consisting of OH and an Q acyl group derived from an organic carboxylic acid having 1–18 carbon atoms,
$R_3$ is selected from the group consisting of hydrogen and a methyl group,
$R_4$ is selected from the group consisting of a fluoro, bromo and chloro atom.

2. An 11β-halo-steroid of the formula:

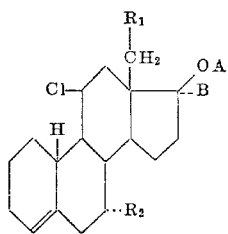

wherein

A is selected from the group consisting of hydrogen and an acyl group derived from an organic carboxylic acid with 1–18 carbon atoms,
B is selected from the group consisting of an alkyl, alkenyl and alkynyl group with 1–4 carbon atoms,
$R_1$ and $R_2$ are selected from the group consisting of hydrogen and a methyl group.

3. An 11β-halo-steroid of the formula:

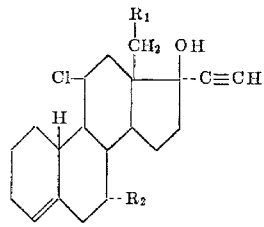

wherein $R_1$ and $R_2$ are selected from the group consisting of hydrogen and a methyl group.

4. Δ⁴ - 3 - desoxo - 11β - chloro - 17β - hydroxy - 17α-ethynyl-oestrene.
5. Δ⁴ - 3 - desoxo - 11β - chloro - 17β - hydroxy - 17α-ethynyl-18-methyl-oestrene.
6. Δ⁴ - 3 - desoxo - 7α - methyl - 11β - chloro - 17β-hydroxy-17α-ethynyl-oestrene.

References Cited
UNITED STATES PATENTS 3,056,807  10/1962  Ayer _____ 260—397.3
3,112,328  11/1963  Szpilfogel et al. ___ 260—397.3

HENRY A. FRENCH, Primary Examiner

U.S. Cl. X.R.
260—239.55 C, 397.3, 397.45, 999

UNITED STATES PATENT OFFICE
CERTIFICATE OF CORRECTION

Patent No. 3,767,685  Dated October 23, 1973

Inventor(s) Nicolaas Pieter Van Vliet

It is certified that error appears in the above-identified patent and that said Letters Patent are hereby corrected as shown below:

Column 3, lines 43-44 should read:

usually prepared from a $\Delta^4$-3,17-diketo-oestrene, or a $\Delta^4$-3-keto-17$\beta$-hydroxy-oestrene, with possibly the desired sub- In Claim 1, line 23, "Q Acyl" should read --O Acyl--.

Signed and sealed this 12th day of February 1974.

(SEAL)
Attest:

EDWARD M. FLETCHER, JR.
Attesting Officer

C. MARSHALL DANN
Commissioner of Patents